Nov. 15, 1966 V. D. OLSON 3,285,472

CARTON HOLDING AND POURING DEVICE

Filed Jan. 21, 1966

INVENTOR.
VERLYN D. OLSON
BY
ATTORNEYS

United States Patent Office 3,285,472
Patented Nov. 15, 1966

3,285,472
CARTON HOLDING AND POURING DEVICE
Verlyn D. Olson, 304 NW. 4th St., Brainerd, Minn.
Filed Jan. 21, 1966, Ser. No. 522,135
3 Claims. (Cl. 222—86)

The invention herein relates to improvement in a pouring device used in connection with a liquid containing carton, such as is used to contain milk.

It is desirable and an object of this invention to have such a device which is arranged and constructed to retain a liquid containing carton, provide a convenient means for holding the same and provide means for conveniently pouring the liquid from said carton.

It is another object of this invention to provide a device adapted to receive a carton and to provide means for conveniently rupturing said carton and for pouring the liquid from said container.

It is a further object of this invention to provide a device adapted to retain a carton, such as that indicated, comprising a pouring spout having a portion thereof arranged to rupture said carton upon being positioned upon said carton with said spout becoming functionally integral with said carton.

These and other objects and advantages of the invention will be fully set forth in the following description made in connection with the accompanying drawings in which like reference characters refer to similar parts throughout the several views and in which.

Figures 1, 2, 3:
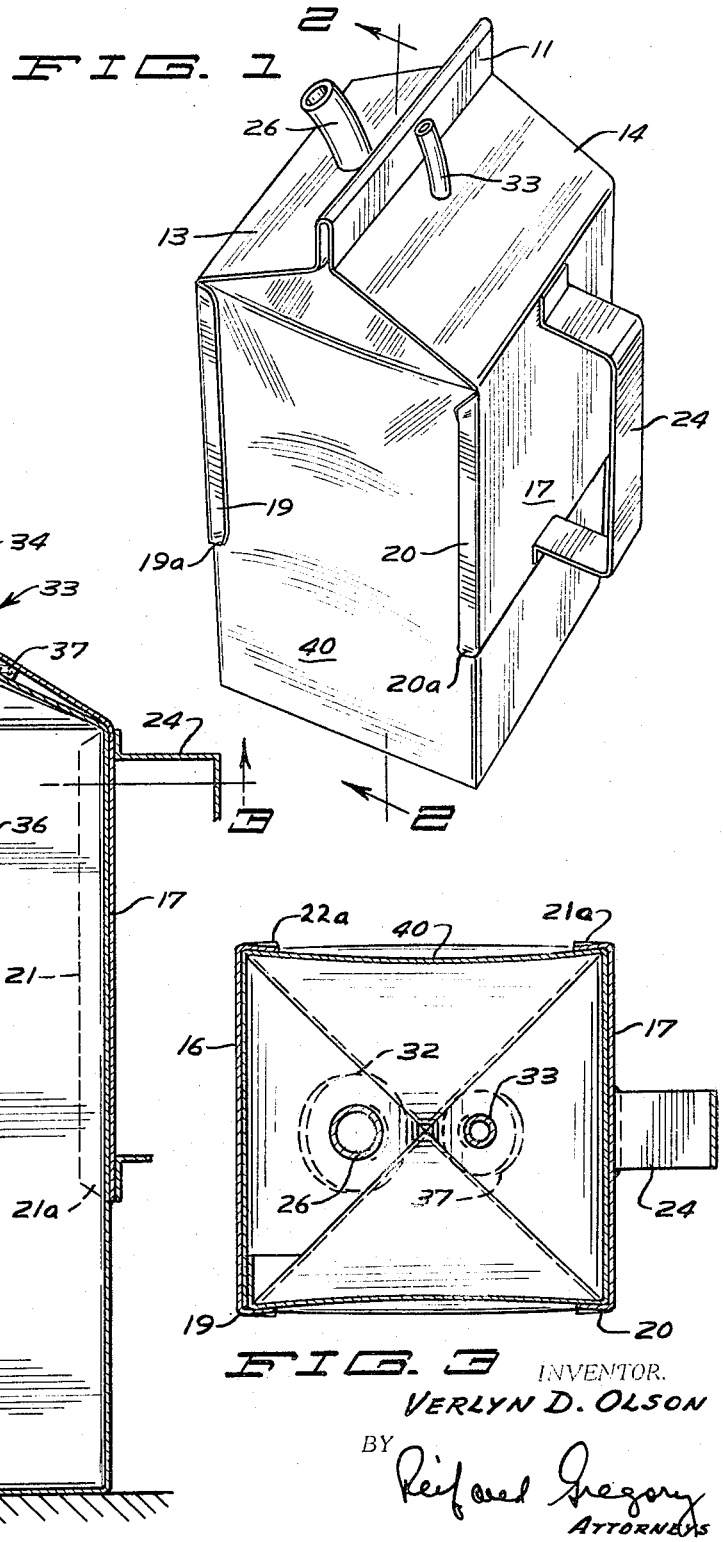
FIG. 1 is a perspective view of a preferred embodiment of the device herein.
FIG. 2 is a view in vertical section taken on line 2—2 of FIG. 1 as indicated.
FIG. 3 is a view in horizontal section taken on line 3—3 of FIG. 2 as indicated.

Referring to the drawings, the invention herein comprising a carton holding and pouring device is indicated generally by the reference numeral 10.

In the preferred embodiment shown, said device is of unitary construction readily formed of a blank of suitable sheet stock such as of stainless steel or chrome plated material.

Said device comprises an upper transverse ridge portion 11 substantially of inverted U-shape in cross section to accommodate a like ridge which is present on conventional milk cartons.

Upper walls 13 and 14 incline downwardly from either side of said ridge portion and respectively have substantially vertically disposed portions 16 and 17 forming side walls. It will be noted that the device 10 conforms generally to the form of the carton 40, which carton is representative of milk cartons generally.

Angled inwardly of the respective ends of the side wall 16 are vertical flange portions 19 and 22. Said flange portions will be disposed at acute angles to said side wall. In like manner said side wall 17 is provided with vertically disposed flange portions 20 and 21.

The lower end or tip portions 19a–22a respectively of said flanges are flared outwardly.

Extending outwardly of said side wall 17 and secured thereto as by spot welding is a handle 24 shown here to be substantially U-shaped in side elevation.

Substantially vertically disposed through said upper wall 13 and integral therewith is a dispensing tube 26 which is shown to be substantially circular in cross section having an upwardly projecting spout portion 27 curved in the direction of the side wall 16 and being integral with a depending portion 28 having its free end tapered to form a sharp spur 29. Said tapered end and spur are designed to readily rupture and penetrate the top of a milk carton.

Disposed substantially vertically through said upper wall 14 and integral therewith is a tubular air vent 33 having an upwardly projecting portion 34 and a depending portion 35 having a free end portion tapered to form a spur 36.

Resilient ring like gaskets 32 and 33 are disposed about said depending tubular portions 28 and 35 and seat against the inner surfaces of said upper walls 13 and 14 to provide sealing means with respect to the underlying ruptured walls of a carton.

The ridge 14 will be adapted to yield or flex somewhat on the order of a hinge to permit some separation between said side walls 16 and 17 in disposing the device 10 onto a milk carton.

Operation

It will be understood that the device herein will be provided in sizes to accommodate conventionally sized fluid containing cartons such as milk cartons. The carton 40 is here indicated as being a one-half gallon carton.

The device is extremely easy and simple to use. There is a tendency on the part of the side walls 16 and 17 to incline slightly in the direction of one another. Hence the operator will separate said walls somewhat in disposing the device onto a carton.

A sharp downward jerking motion of said device will cause a ready rupture of the upper sides of the carton by said spurs 29 and 36 and the resulting penetration of the carton by the depending portions of the dispensing tube and the air vent.

The rupture in said carton will be sealed against leakage by the gaskets 32 and 37.

As the device is positioned onto carton 40, the inwardly angled flange portions 19–22 press into the underlying side wall portions of the carton. With reference to FIG. 3, it will be noted that said flange portions exert sufficient pressure to bow inwardly the side walls of said carton at the open ends of the device. There results a substantial frictional engagement or gripping action which aided by the dispensing and air vent tubes extending into the carton provides a very substantial and positive hold onto the carton.

Hence by means of the handle 24, the operator may very conveniently pick up a carton and dispense milk by tilting the carton.

Thus it is seen that I have provided a very simply and efficiently constructed pouring device for a liquid containing carton, and my device has proved to be very successful in practice.

It will of course be understood that various changes may be made in the form, details, arrangement and proportions of the parts, without departing from the scope of applicant's invention which, generally stated, consists in a device capable of carrying out the objects above set forth, in the parts and combinations of parts disclosed and defined in the appended claims.

What is claimed is:

1. A holding and dispensing device for a liquid containing carton comprising
    an open framework
    an upper portion of said framework adapted to overlay the upper end portions of said carton,
    a pair of opposed side walls depending from said upper portion of said framework,
    flange portions at the edges of said side walls angled inwardly thereof for frictional engagement with adjacent underlying wall portions of said carton,
    a dispensing tube carried by said upper portion of said framework, and
    said dispensing tube having a depending portion having a tapered free end portion to rupture said carton.

2. The structure set forth in claim 1, said flange portions having outwardly flared lower end portions.

3. A holding and dispensing device for a liquid containing carton having in combination,
   an inverted substantially U-shaped somewhat resilient framework comprising
   an upper connecting portion,
   a pair of opposed walls depending from said connecting portion,
   said upper portion and walls conforming to the upper portion of said carton,
   means carried at the side edge portions of said walls adapted to be slidable onto and frictionally engage the underlying portions of said carton, and
   a dispensing tube carried by said upper portion having a depending portion to rupture said carton and extend thereinto.

References Cited by the Examiner
UNITED STATES PATENTS

| | | | |
|---|---|---|---|
| 1,864,473 | 6/1932 | Rigby | 222—80 |
| 2,320,084 | 5/1943 | Jundt | 222—86 |
| 2,535,783 | 12/1950 | Churchill et al. | 222—86 |
| 3,143,248 | 8/1964 | Branda | 222—81 |

ROBERT B. REEVES, *Primary Examiner.*

N. L. STACK, *Assistant Examiner.*